United States Patent
Kamimura

(10) Patent No.: US 8,699,869 B2
(45) Date of Patent: Apr. 15, 2014

(54) OPTICAL EQUIPMENT

(75) Inventor: Masayuki Kamimura, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/557,576

(22) Filed: Jul. 25, 2012

(65) Prior Publication Data

US 2013/0028583 A1    Jan. 31, 2013

(30) Foreign Application Priority Data

Jul. 29, 2011  (JP) ................ 2011-166954

(51) Int. Cl.
  *G03B 3/10*  (2006.01)
  *G03B 13/34*  (2006.01)
(52) U.S. Cl.
  USPC ..................... 396/133; 348/333.13
(58) Field of Classification Search
  USPC .......... 396/133, 301–303, 135; 348/333.13
  See application file for complete search history.

(56) References Cited

U.S. PATENT DOCUMENTS

| | | | | |
|---|---|---|---|---|
| 4,639,112 A | * | 1/1987 | Nakai et al. ................ | 396/227 |
| 4,912,498 A | * | 3/1990 | Nakai et al. ................ | 396/227 |
| 5,459,511 A | * | 10/1995 | Uehara et al. .............. | 348/335 |
| 2009/0244048 A1 | * | 10/2009 | Yamanaka ................... | 345/212 |
| 2012/0070139 A1 | * | 3/2012 | Shibuno et al. ............. | 396/133 |
| 2013/0028584 A1 | | 1/2013 | Kamimura .................. | 396/135 |

FOREIGN PATENT DOCUMENTS

JP     2006-158019 A     6/2006

OTHER PUBLICATIONS

U.S. Appl. No. 13/557,558, filed Jul. 27, 2012.

* cited by examiner

*Primary Examiner* — Clayton E Laballe
*Assistant Examiner* — Warren K Fenwick
(74) *Attorney, Agent, or Firm* — Greenblum & Bernstein, P.L.C.

(57) ABSTRACT

Optical equipment which can prevent image blurring and enable a lens to be stopped in a position requiring low power consumption is provided. The optical equipment includes a lens driver supplied with electric power from a camera body to drive a focusing lens. The equipment further includes an aperture driver that drives an aperture and a drive controller that positions the focusing lens to minimize power consumption and controls the aperture driver during opening of the aperture so that the focal position of the focusing lens falls within a focal depth. In this way, a lens position-controller that controls an AF motor can stop the lens in a position that does not cause image blur and reduces power consumption.

6 Claims, 9 Drawing Sheets

FIG.4
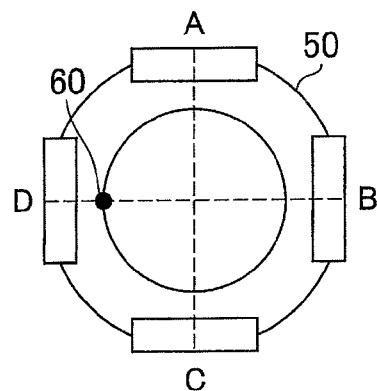
(a)
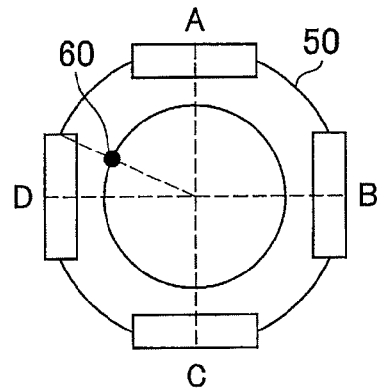
(b)
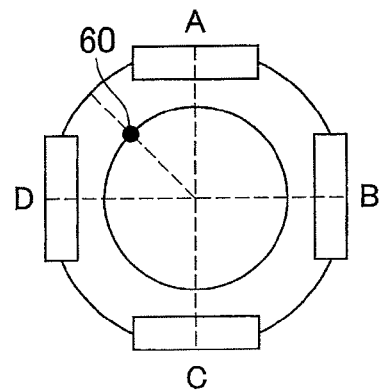
(c)
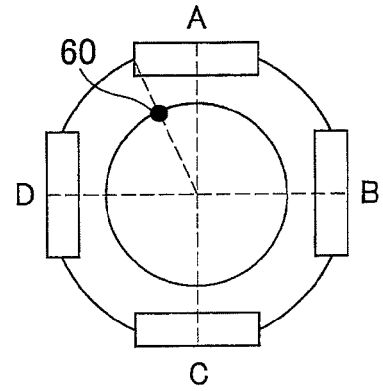
(d)
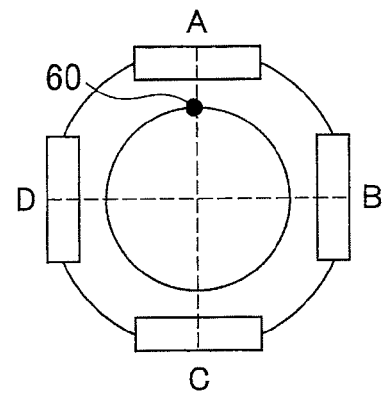
(e)

FIG.8

| F-VALUE | ALLOWABLE LENS DISPLACEMENT(um) |
|---|---|
| 1.7 | 15.6 |
| 2.1 | 18.7 |
| 2.5 | 22.4 |
| 3.0 | 26.9 |
| 3.6 | 32.2 |
| 4.3 | 38.7 |
| 5.2 | 46.4 |
| 6.2 | 55.7 |
| 7.4 | 66.9 |
| 8.9 | 80.2 |
| 10.7 | 96.3 |
| 12.8 | 115.6 |

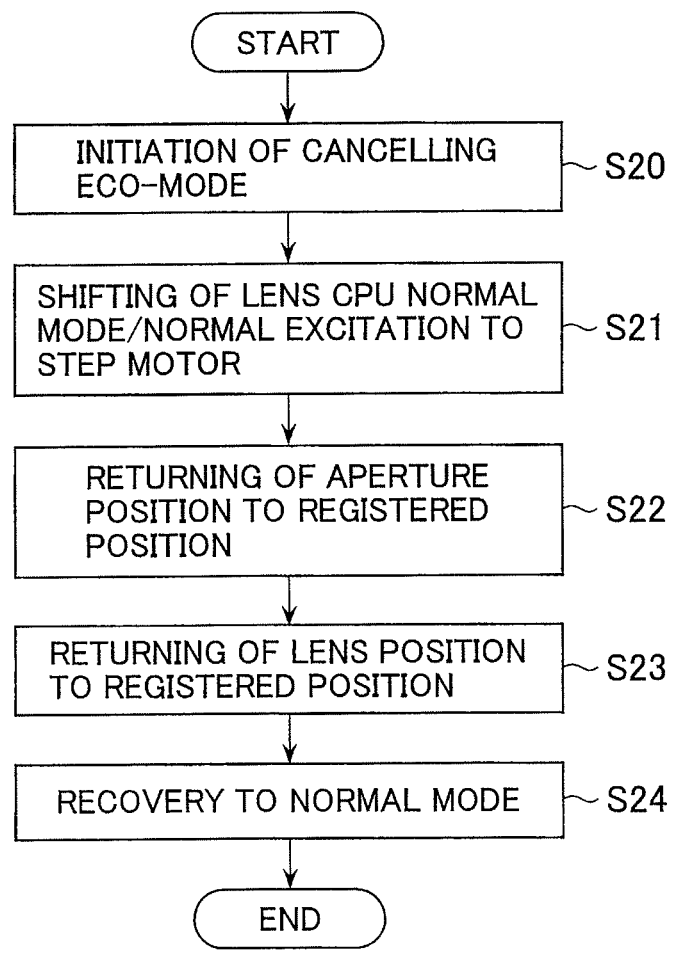

OPTICAL EQUIPMENT

BACKGROUND OF THE INVENTION

1. Field of the Invention

The present invention relates to optical equipment, in particular a lens position-control device for controlling a lens driving device.

2. Description of the Related Art

Hitherto, various attempts for low power consumption have been developed in digital cameras. As a result of one of these attempts, there is known a structure for reducing power consumption by a step motor used in an image stabilization mechanism, as described in Japanese Unexamined Patent Publication No. 2006-158019. In this structure, after image stabilization a magnetic pole of the step motor is moved from its stopping position to a more stable position and thereafter, the supply of excitation power to the step motor is stopped. With this structure, it is possible to prevent image blurring caused by an expected movement of the magnetic pole to the stable position at the time of imaging, and it is also possible to reduce power consumption of the step motor. This structure is also applicable to an autofocus mechanism for controlling the lens position with the use of a step motor.

In the application of the above-mentioned structure for an autofocus mechanism, however, a problem arises when the magnetic pole is simply moved to a position requiring low power consumption. This is because the stopping position of the magnetic pole is associated with the stopping position of the lens. Namely, there is a possibility of image blurring after the movement of the magnetic pole despite completion of a focusing operation before the movement of the magnetic pole. This image blurring has a tendency of gradually intensifying as the light-receiving pixel pitch decreases. In recent years digital cameras have come equipped with an image pickup device whose number of pixels has been dramatically increased to provide high resolution images, and therefore, image blurring should be eliminated since the light-receiving pixel pitch of such a digital camera is small. Therefore, an object of the present invention is to provide optical equipment capable of stopping a lens, namely, a magnetic pole in a position producing no image blur and requiring low power consumption.

SUMMARY OF THE INVENTION

Therefore, an object of the present invention is to provide optical equipment capable of stopping a lens, namely, a magnetic pole in a position producing no image blur and requiring low power consumption.

According to the present invention, there is provided optical equipment comprising: a lens driving unit supplied with electric power to drive a focusing lens; an aperture driving unit configured to drive an aperture; and an aperture drive-control unit configured to position the focusing lens to minimize power consumption and control the aperture driving unit during the opening of the aperture so that the focal position of the focusing lens falls within a focal depth.

According to the present invention, there is also provided a camera comprising: a camera body; a lens barrel mounted on the camera body; lens driving unit arranged in the lens barrel and supplied with electric power from the camera body to drive a focusing lens; an aperture driving unit configured to drive an aperture; and an aperture drive-control unit configured to position the focusing lens to minimize power consumption and control the aperture driving unit during the opening of the aperture so that the focal position of the focusing lens falls within a focal depth.

According to the present invention, there is also provided a camera comprising a camera body, a lens barrel mounted on the camera body, a lens driving unit arranged in the lens barrel and supplied with electric power from the camera body to drive a focusing lens, a drive-setting unit configured to set an optimal drive amount for positioning the focusing lens at an appropriate focal depth while minimizing the amount of power consumed in the process, and a lens position-control unit configured to control the lens driving unit based on the drive amount set by the drive-setting unit, thereby controlling the movement of the focusing lens.

BRIEF DESCRIPTION OF THE DRAWINGS

The object and advantages of the present invention will be better understood from the following description, with reference to the accompanying drawings in which:

FIG. 4 is a schematic view of a step motor in the application of the embodiment of the present invention;

FIG. 8 is a table showing a relationship between F-values and the allowable lens displacement in an embodiment of the present invention;

FIG. 11 is a flow chart that indicates the process for cancelling the eco-mode in an embodiment of the present invention.

DESCRIPTION OF THE PREFERRED EMBODIMENTS

Figure 1:
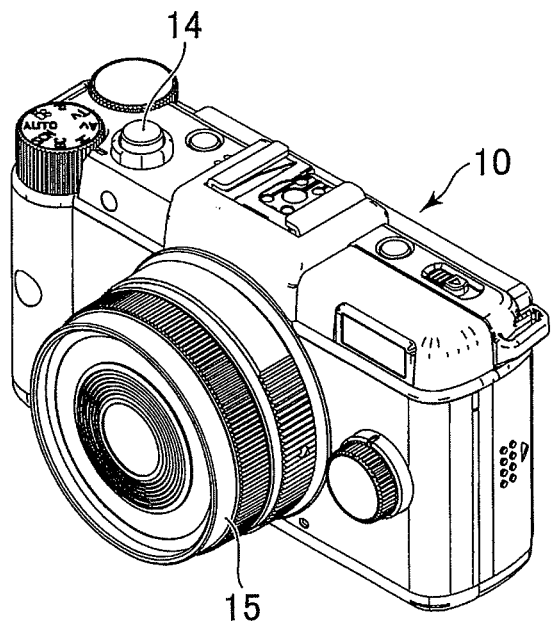
FIG. 1 is a perspective view of a camera in accordance with an embodiment of the present invention.
Figure 2:
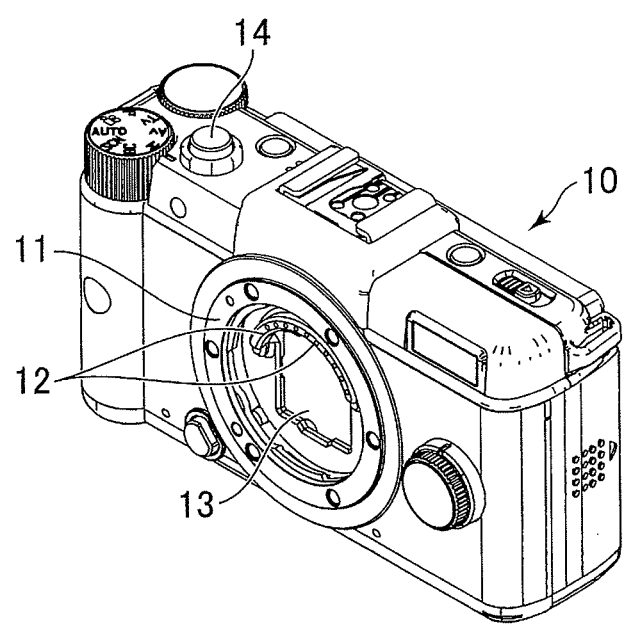
FIG. 2 is a view of the camera with its lens removed in the application of the embodiment of the present invention.

One embodiment of the present invention will be described with reference to the drawings below. FIG. 1 shows the appearance of an interchangeable-lens camera, while FIG. 2 shows the camera when a lens barrel 15 has been removed from a camera body 10. In this illustrated camera system, the lens barrel 15 is detachably mounted on the camera body 10.

In the camera body 10, a plurality of electrical contacts 12 are circumferentially arranged on the inner peripheral side of a lens mount 11. Located below the electrical contacts 12 is an image pickup unit 13 accommodating imaging elements (not shown). When the camera body 10 is powered on, a moving image can be produced by the imaging elements and further displayed on a monitor (not shown). A shutter button 14 is arranged on a top surface of the camera body 10.

The electrical constitution of this camera will be described with reference to FIG. 3. In the camera body 10, a camera processor 20 is connected to a body-side lens power source 22 for supplying the lens barrel 15 with electric power and an image sensor 24 for converting light collected by a lens to electrical signals. The body-side lens power source 22 and the image sensor 24 are controlled by the camera processor 20.

In the lens barrel 15, a lens CPU 30 is connected to a lens-side lens power source 32 for supplying the lens CPU 30 with electric power. Also connected to the lens CPU 30 are an AF motor 36 (lens driving unit) which controls the position of an AF lens (focusing lens) 34 and a motor driver 38 which controls the voltage to the AF motor 36. The AF motor 36 and the motor driver 38 are both controlled by the lens CPU 30 and supplied with electric power. Further, a lens position sensor 40 is connected to the AF lens 34 to transmit the position of the AF lens 34 to the CPU 30. An aperture motor 42 is connected to the lens CPU 30 for control purposes. Again, the aperture motor 42 controls the movement of an aperture 44 through a decelerating mechanism 43 (aperture drive-control unit), thereby adjusting an aperture value.

The camera processor 20 and the lens CPU 30 are connected to each other through the electrical contacts 12 (see FIG. 12), thereby allowing mutual communication. Further, the body-side lens power source 22 and the lens-side lens power source 32 are also connected to each other through the electrical contacts 12, so that the lens-side lens power source 32 is supplied with electrical power from the body-side lens power source 22.

Figure 5:
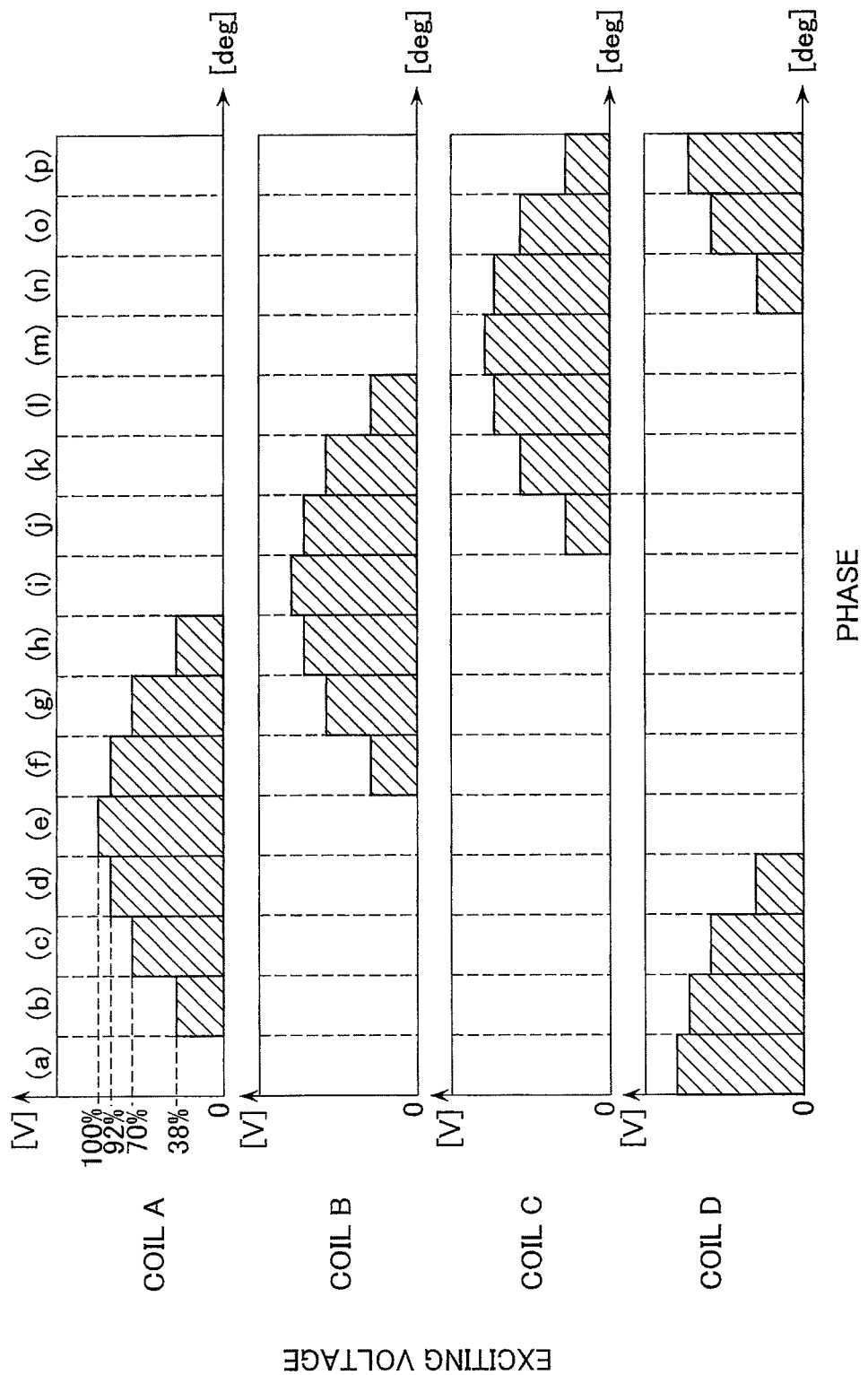
FIG. 5 is a chart showing the voltages input to the step motor the application of the embodiment of the present invention.

FIG. 4 is a schematic view of a step motor 50 installed in the AF motor 36. FIG. 5 is a view showing a relationship between voltages applied to stator coils A to D and the phase of a magnetic pole 60 on the rotor. In FIG. 5, the horizontal axis represents the phase of the magnetic pole 60, while the vertical axis represents the voltages. The operation of the step motor 50 in micro-step driving will be described with reference to FIGS. 4 and 5. Suppose, for simplicity, the magnetic pole 60 is a south pole and each of coils A to D becomes a north pole when an excitation voltage is applied thereto.

In the state (a) of FIG. 4 and the state (a) of FIG. 5, when a maximum excitation voltage is applied to only the coil D, it becomes a North pole, so that the magnetic pole 60, as a South pole, is attracted by the coil D to stop at an initial position (initial phase). Next, in the state (b), 38% of the maximum excitation voltage is applied to the coil A and 92% of the maximum is applied to the coil D. Then, the magnetic pole 60 is attracted to both the coil A and the coil D, specifically to a position closer to the coil D and thus suspended there. In the state (c), 50% of the maximum excitation voltage is applied to the coil A and 50% of the maximum to coil D. Then, the magnetic pole 60 is attracted to an intermediate position between the coil A and the coil D and thus suspended there. In the state (d), 92% of the maximum excitation voltage is applied to the coil A and 38% of the maximum to the coil D. Then, the magnetic pole 60 is attracted to both the coil A and the coil D, specifically to a position closer to the coil A and thus suspended there. In the state (e), the maximum excitation voltage is applied to only the coil A, thus causing the magnetic pole 60 to be attracted to the coil A and be suspended there. In this way, the position of the magnetic pole 60 depends on a ratio between respective excitation voltages applied to the coils A and D. The magnetic pole 60 is rotated through the states (a) to (e), covering an angle of 90 degrees from the initial position.

Figure 6:
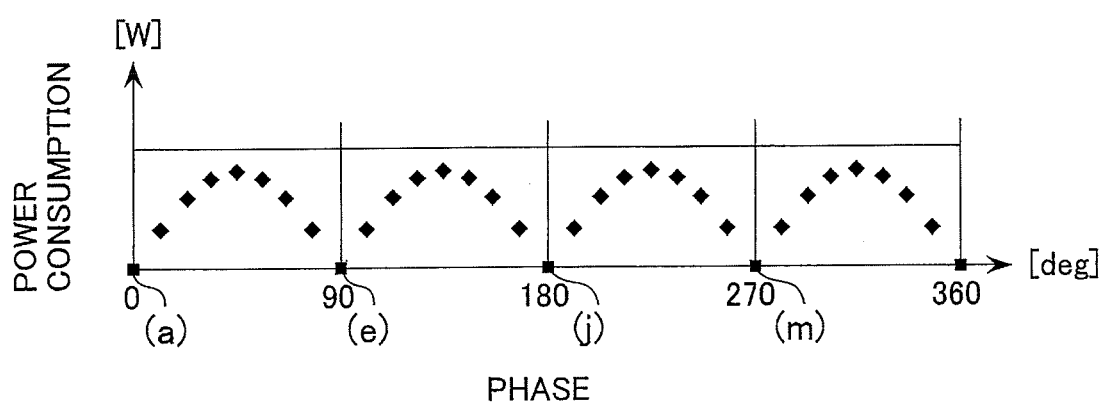
FIG. 6 is a graph showing the power consumption profile of the step motor under micro-step driving, in the application of the embodiment of the present invention.

FIG. 6 is a graph showing the relationship between the phase of the magnetic pole 60 and the power consumption. In the figure, the horizontal axis represents the phase of the magnetic pole 60, while the vertical axis represents the power consumption of the step motor 50. In FIG. 6, the numbered states (a), (e), (i) and (m) correspond to the same-numbered states in FIGS. 4 and 5.

Namely, in the state (a) of FIG. 6, the excitation voltage is applied to only the coil D, so that the magnetic pole 60 stops in the initial position (see FIG. 4). In the state (e), the excitation voltage is applied to only the coil A, so that the magnetic pole 60 stops in a position on rotated 90 degrees from the initial position. In the state (j), the excitation voltage is applied to only the coil B, so that the magnetic pole 60 stops in a position rotated 180 degrees from the initial position. In the state (m), the excitation voltage is applied to only the coil C, so that the magnetic pole 60 stops in a position on rotated 270 degrees from the initial position. Thus, in each of the states (a), (e), (i) and (m), the excitation voltage is applied to only one of the 4 coils. Here, these states will be referred to as "single-phase driving states", respectively. In the single-phase driving states, power consumption is minimized relative to the other states. Additionally, both the respective positions of the magnetic pole 60 and the respective discrete lens positions along the optical axis of the AF lens 34 at the time of the single-phase driving states will be referred to as "single-phase positions", respectively.

Figure 7:
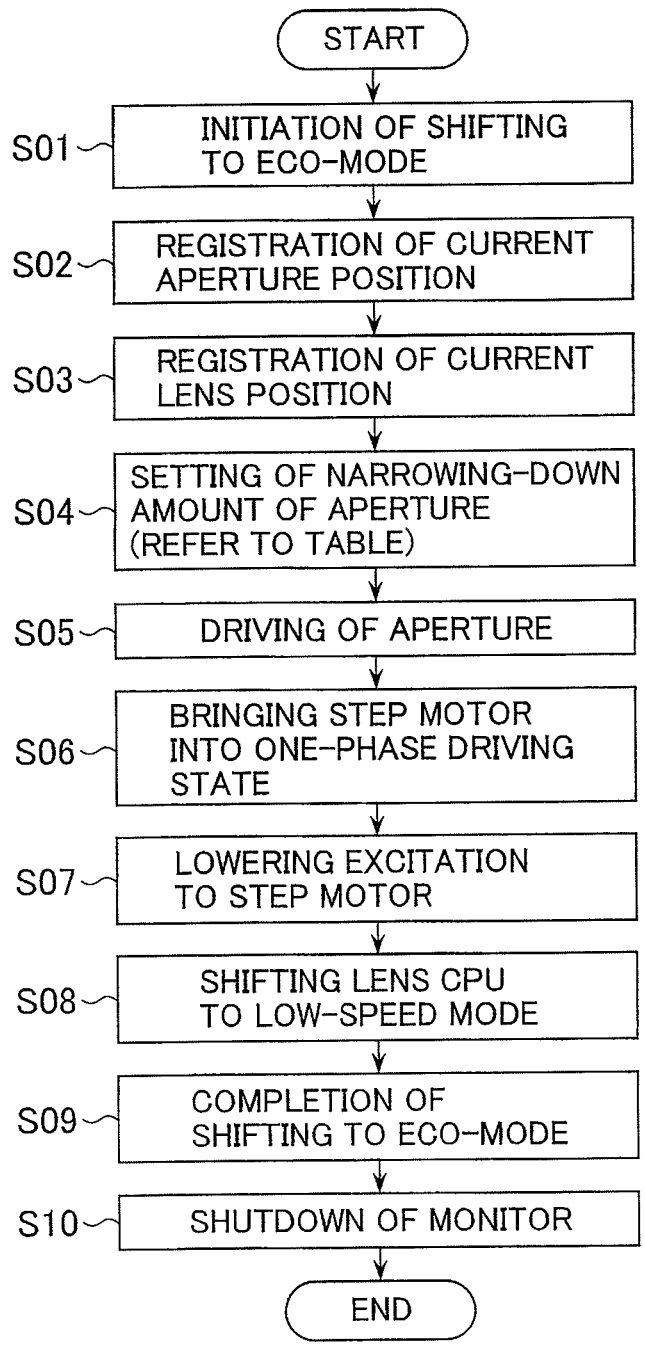
FIG. 7 is a flow chart that indicates the process for shifting to an eco-mode in the embodiment of the present invention.

FIG. 7 is a flow chart of the operation for shifting from the normal mode to the eco-mode with reduced power consumption. The shifting to the eco-mode is initiated when the camera body 10 (see FIG. 1) and the lens barrel 15 are operated for a certain period, about 10 seconds for example. The eco-mode designates a condition where the power consumption of the camera body 10 and the lens barrel 15 are both low. The operations at steps S01 and S10 correspond to processes for shifting to the eco-mode on the camera-body side, while the operations at steps S02 to S09 correspond to processes for shifting to the eco-mode on the side of the lens barrel 15.

At step S01, the computing speed of the camera processor 20 is reduced to increase the power consumption of the camera body 10, so that its frame rate and the brightness of a monitor are reduced. At step S02, the position of the aperture 44 (see FIG. 1), namely, an amount of narrowing-down (opening degree) is registered in a memory (not shown) provided in the lens barrel 15. Next in step S03, the position of the AF lens 34 in the optical axis direction is registered in the memory.

Next, in step S04, an aperture value to reduce blurring of an image is determined with reference to the table of FIG. 8 that contains the relationship between F-values (aperture values) and corresponding lens movements for the AF lens 34 from its current in-focus position. In other words, step S04 is carried out to set the correct distance through which the AF lens 34 is to be moved so that it will be in the focal depth. Then, at step S05, the aperture 44 is moved using the decelerating mechanism 43 to obtain the set aperture value. Even though the power supply to the aperture motor 42 is interrupted after it finishes driving the aperture 44, no further movement is necessary for the aperture 44 because the reduction ratio of the decelerating mechanism 43 is relatively large. Consequently, the aperture is maintained in the correct position that corresponds to the established aperture value.

Figure 9:
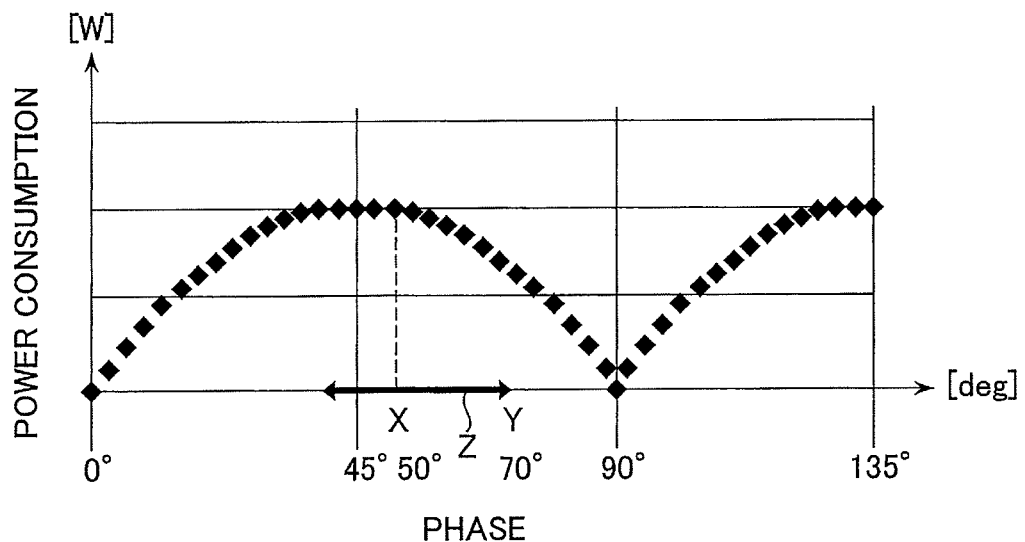
FIG. 9 is a chart indicating the relationship between the phase of the magnetic pole of the step motor and its power consumption, in an embodiment of the present invention.

The AF lens 34 is moved in the optical axis direction by the rotation of the magnetic pole 60. Thus, the allowable displacement (focal depth) of the AF lens 34 can be represented by an angle of rotation Z of the magnetic pole 60. In FIG. 9, horizontal axis represents the phase of the magnetic pole 60, while the vertical axis represents the power consumption of the step motor 50. Further, the focal depth, i.e. the allowable displacement of the AF lens 34 is converted to an angle of rotation of the magnetic pole 60 and also illustrated as the rotation angle Z on the horizontal axis.

Assume, in FIG. 9, the magnetic pole 60 is located in the position X at step S04, effecting a focus state. Either 0 degrees or 90 degrees are allowable single-phase positions for the rotation angle Z. Accordingly, if the magnetic pole 60 is moved to either 0 degrees or 90 degrees as the single-phase positions at the current aperture value, namely the AF lens 34 is moved to the single-phase position at the current aperture value, then the image blur would increased to a recognizable extent.

Figure 10:
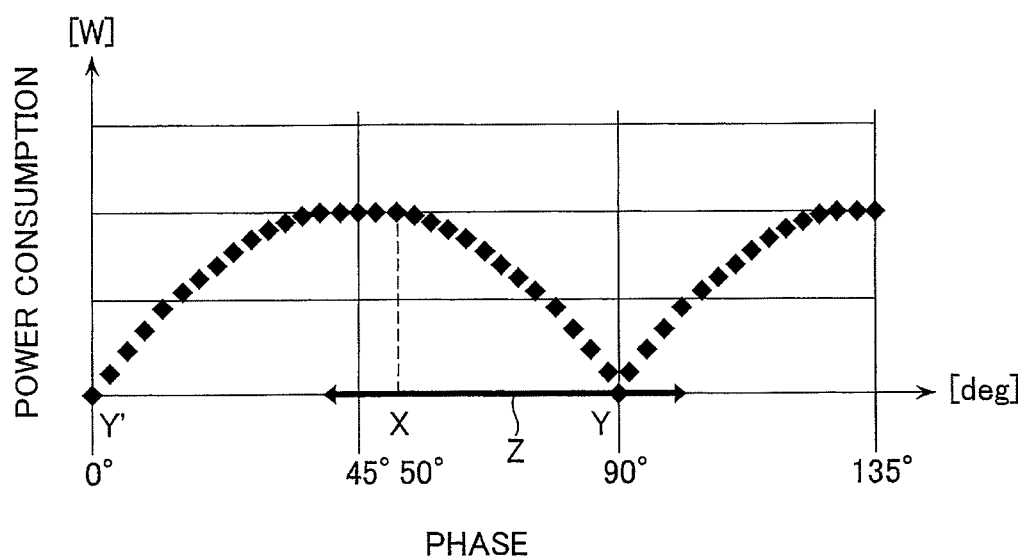
FIG. 10 is a chart indicating the relationship between the phase of the magnetic pole of the step motor and its power consumption, in an embodiment of the present invention.

At this time, with reference to the table of FIG. 8, the F-value, i.e., an aperture opening is set and controlled so that the allowable rotation angle Z of the magnetic pole 60, which is converted from the allowable displacement of the AF lens 34, includes the single-phase position closest to the present stopping position (aperture driving unit). After setup, the allowable rotation angle Z includes the single-phase position Y that is closest to the position X, which is 90 degrees as shown in FIG. 10. In other words, as the F-value increases the focal depth also deepens, thus requiring a greater displacement of the AF lens 34 so that magnetic pole 60 can rotate through a lager angle than its span of rotation prior to setup.

At step S06, the magnetic pole 60 is moved to the position Y. In the position Y, the AF motor 36 is in the single-phase driving state while stopping the AF lens 34 in a position where the imaging plane falls within the focal depth. In this way, at steps S04 and S06, it is possible to stop the AF lens 34 in the single-phase position while adjusting an F-value (lens-position control unit). Then, power consumption is minimized while a small image is displayed on a monitor without recognizable blurring.

Figure 3:
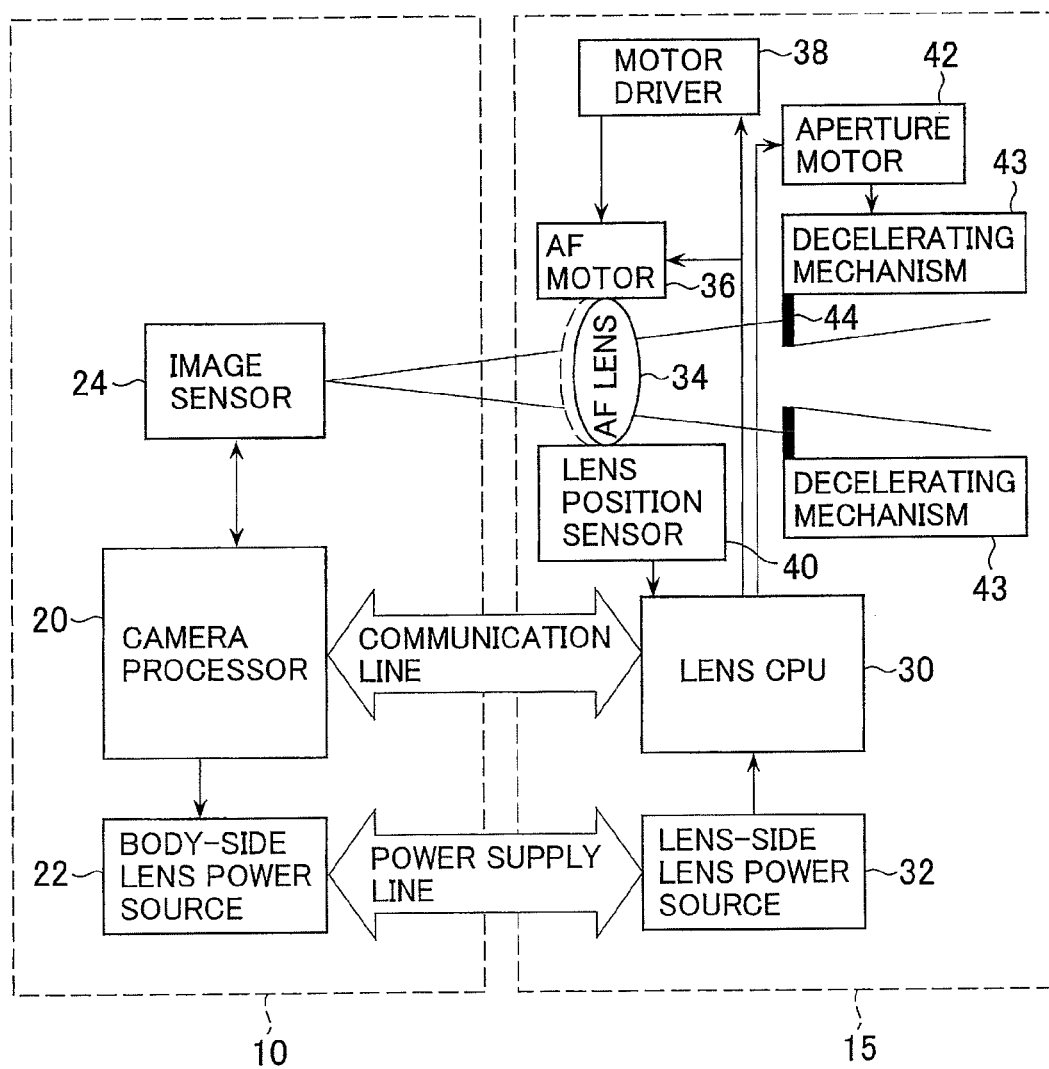
FIG. 3 is an electrical block diagram of the camera in the application of the embodiment of the present invention.

At this time, the position of the magnetic pole 60, namely, the position of the AF lens 34 is detected by the lens position sensor 40 and transmitted to the lens CPU 30 (see FIG. 3). When the condition of minimum power consumption is recognized by the lens CPU 30, the excitation voltage is decreased at step S07. When a voltage control signal is transmitted from the lens CPU 30 to the motor driver 38, the excitation voltage is decreased by the motor driver 38 (excitation control unit). Consequently, the magnetic pole 60 is suspended under a condition of low power consumption while maintaining a minimum static torque.

Subsequently, the computing speed of the lens CPU 30 is reduced at step S08. By reducing the computing speed of the lens CPU 30, it is possible to decrease the power consumption of the lens CPU 30 (CPU power control unit). Then, at step S09, the shifting operation to the eco-mode is completed.

If the camera body 10 and the lens barrel 15 are not operated for a certain period after shifting to the eco-mode is completed in the lens barrel 15, the power supply to the monitor is shut down at step S10. The power consumption is further reduced by the shutdown of power to the monitor.

As mentioned above, by the processes at steps S01 to S10, it is possible to stop the AF lens 34, i.e. the magnetic pole 60 in a position producing no image blur and requiring low power consumption.

The operation of canceling the eco-mode is illustrated in FIG. 11. At step S20, the canceling operation is initiated when the camera body 10 (see FIG. 1) or the lens barrel 15 is manipulated. The computing speed of the camera processor 20, the frame rate and the brightness of the monitor are all reinstated. At step S21, both the computing speed of the lens CPU 30 and the excitation voltage supplied to the AF motor 36 are returned to their respective normal state.

At step S22, the aperture 44 is returned to the position registered at step S02. At step S23, the AF lens 34 is also returned to the position registered at step S03. At steps S20 to S23, the lens 34 and the aperture 44 are returned to their states in the normal mode. At step S24, the camera body 10 and the lens barrel 15 return to the normal mode.

Note, this mechanism is applicable to not only digital cameras related to the present invention, but also to other optical equipment requiring focusing, such as electronic binocular glasses. Regarding the step motor, additionally, it may comprise any type of motor so long as it can be operated in half-step and micro-step driving etc, and further be equipped with coils. Although the step motor of this embodiment is adapted so as to rotate through 360 degrees in 16 steps, the number of steps can be established optionally. Moreover, at step S07 of FIG. 7, if the motor driver 38 does not have a function for controlling voltages, the excitation voltage could be decreased by reducing the voltage supplied from the lens CPU 30 to the AF motor 36.

As will be understood by those familiar with the art, the present invention may be embodied in other specific forms without departing from the spirit or essential characteristics thereof. For example, the description above assumes an embodiment in which the present invention is applied to a digital camera, the present invention is not limited to this configuration and is applicable to other optical equipment having a focusing lens, for example, an autofocus telescope, autofocus binocular glasses, etc. Accordingly, the disclosures and descriptions herein are intended to be illustrative, but not limiting, of the scope of the invention which is set forth in the following claims.

The present disclosure relates to subject matter contained in Japanese Patent Application No. 2011-166954 (filed on Jul. 29, 2011), which is expressly incorporated herein, by reference, in its entirety.

The invention claimed is:

1. Optical equipment comprising:
   a lens driver supplied with electric power to drive a focusing lens, said lens driver comprising a step motor capable of half-step and micro-step driving;
   an aperture driver configured to drive an aperture; and
   an aperture drive-controller configured to:
      stop said focusing lens in a position that is maintained with minimum power consumption, by controlling the movement of said step motor to a single-phase position where said step motor holds said focusing lens with the minimum power consumption; and
      control said aperture driver to set an opening amount of said aperture so that the focal position of said focusing lens falls within a focal depth when the focusing lens is stopped at the position that is maintained with minimum power consumption.

2. The optical equipment according to claim 1, further comprising:
   a CPU configured to control said lens and said lens driver;
   a CPU power controller configured to reduce power consumption of said CPU by reducing a computing speed of said CPU; and
   an excitation controller configured to reduce the power consumption of said lens driver by decreasing the excitation voltage supplied to said lens driver.

3. The optical equipment according to claim 1, wherein the step motor includes a plurality of coils, and the single-phase position comprises a position where an excitation voltage is applied to only one of the plurality of coils.

4. The optical equipment according to claim 1, wherein the step motor includes a plurality of single-phase positions, the aperture-drive controller further detects a current position of the step motor, and the single-phase position of the plurality of single-phase positions, which is closest to the current position of the step motor, the aperture-drive controller moves the step motor from the current position to the determined single-phase position closest to the current position, and the aperture-drive controller determines the opening amount of the aperture so that the focal position of the focusing lens falls within the focal depth when the step motor is stopped at the determined single-phase position closest to the current position, and reduces the aperture to the determined opening amount.

5. The optical equipment according to claim 4, wherein the aperture drive-controller determines the single-phase position closest to the current position and the opening amount of the aperture, when a low consumption mode starts.

6. A camera comprising:
a camera body;
a lens barrel mounted on said camera body;
a lens driver arranged in said lens barrel and supplied with electric power from said camera body to drive a focusing lens, wherein said lens driver comprises a step motor capable of half-step and micro-step driving;
an aperture driver configured to drive an aperture; and
an aperture drive-controller configured to:
stop said focusing lens in a position that is maintained with minimum power consumption, by controlling the movement of said step motor to a single-phase position where said step motor holds said focusing lens with the minimum power consumption; and
control said aperture driver to set an opening amount of said aperture so that the focal position of said focusing lens falls within a focal depth when the focusing lens is stopped at the position that is maintained with minimum power consumption.

* * * * *